June 7, 1932.    C. G. MAHANA ET AL    1,862,155

ENGINE FUEL AND OIL CONTROL MEANS

Filed Feb. 17, 1930

INVENTORS
CHARLES G. MAHANA
CHARLES GROSS
BY
Roy M Eilers
ATTORNEY

Patented June 7, 1932

1,862,155

UNITED STATES PATENT OFFICE

CHARLES G. MAHANA, AND CHARLES GROSS, OF THREE RIVERS, MICHIGAN, ASSIGNORS TO FAIRBANKS, MORSE & CO., OF CHICAGO, ILLINOIS, A CORPORATION OF ILLINOIS

ENGINE FUEL AND OIL CONTROL MEANS

Application filed February 17, 1930. Serial No. 429,061.

This invention relates to engine fuel and oil control means and more particularly to certain improvements in internal combustion engines adapted particularly for conserving the supply of fuel and lubricant.

An object of the invention is attained in an improved arrangement of the fuel tank and crank case, whereby the fuel tank is adapted to serve the purpose of radiating and stabilizing engine heat, in addition to its usual purpose of merely containing a supply of fuel.

A further object of the invention is attained in a simple means and arrangement tending to cool the supply of lubricant by means of the fuel supply and tending to warm the fuel supply by heat absorption from the crank case oil and vapors.

A still further object of the invention is attained in an improved arrangement of breather passages tending to conserve the supply of lubricating oil.

Yet a further object of the invention is attained in a novel arrangement of means constituting an oil-trap in connection with the breather passages of an internal combustion engine.

Figure 1:
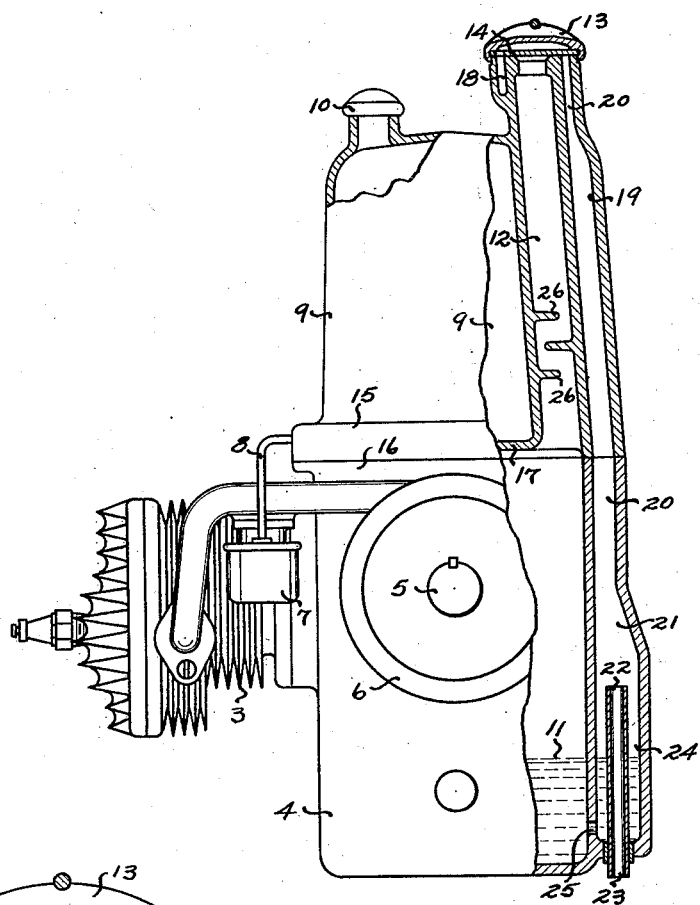
Figure 2:
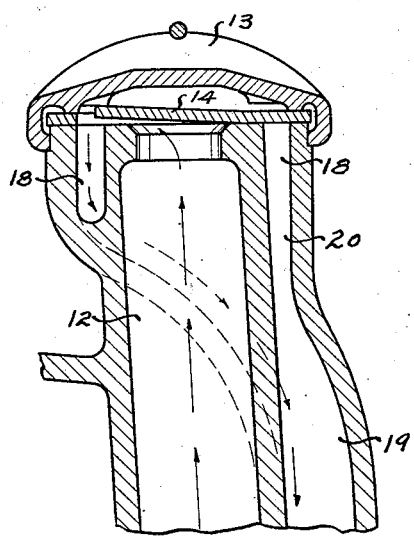

Further objects and advantages will appear in the course of the description and from the accompanying drawing, in which Fig. 1 is a side elevation, partly in section, of a gasoline engine of automotive type to which certain features of the invention have been applied, and Fig. 2 is a relatively enlarged vertical section through a portion of the breather and oil filler passages.

Referring now by reference numerals to the drawing, a cylinder 3 shown as being of air cooled, horizontal type, may be connected in the usual manner with a crank case 4, the cylinder and case serving in any suitable manner to house a piston and connecting rod (not shown) in operative relation with the crank shaft 5, to which may be affixed a fly wheel 6. According to the present construction a carburetor 7 is supplied through a fuel pipe 8 which, in turn, is connected near the lower portion of the fuel tank 9. A filler extension provided with a cap 10 is shown as constituting means for replenishing the supply of fuel in tank 9.

An engine constructed in accordance with the present invention, may be lubricated either solely by splash or by pressure, or by any suitable combination oiling means, there being shown a supply of oil preferably kept at or near the level indicated by numeral 11 in the crank case. The oil may be added to the crank case supply through a passage or pipe such as 12, provided with a cap or closure 13, preferably of cupped annular construction and which may be threaded, flanged or otherwise secured in place near the outer end of the passage 12. Supported or suspended, by preference, across and within the cap 13 is a valve 14 which may be of metal, leather, fiber or other suitable material and which may be positioned, as best seen in Fig. 2, between the cap 13 and the outer edge of the portion constituting the passage 12. The purpose of the valve 14 will hereinafter more clearly appear.

According to present preference, the engine is so designed that the crank case is provided with one open side or wall, in the present case the top of the crank case casting being left open, except as it is covered or closed by the tank 9, for convenience of access to parts inside the case. As shown, the fuel tank 9 serves as a cover or closure for this opening and therefore replaces a separate cover member with holding means therefor which otherwise would have to be provided merely to serve as a closure for one wall of the case.

While the tank 9 may be formed of sheet metal or any other material customarily employed in the trade, the preferred arrangement is to form a flange 15 at or near the base of the tank and which engages with a corresponding or mating flange 16 about the adjacent side of the crank case. These flanges may be bolted or otherwise connected to position the tank on to the crank case. It will be seen that by this arrangement the bottom wall 17 in the fuel tank constitutes the top wall or closure of the case.

With further reference to the breather and oil conserving arrangement of the engine as shown, there is formed near the upper or outer portion of the pipe 12, an annular chamber or passage 18, opening upwardly adjacent the valve 14 and so arranged that the chamber or passage 18 is in connection with the passage 12, only when the valve 14 is opened as will hereinafter appear.

The annular chamber is in direct communication with, or constitutes a continuation of a downwardly extending passage 19 having near its upper portion a tapered or relatively constricted throat 20. As will be noted from Fig. 1, the passage 19 is carried downwardly not only through the fuel tank casting, in the present example being cored therein, but continues as an auxiliary portion 20, extending along side the crank case 4. The passage 20 may be, assuming that the crank case is of cast construction, formed as an integral part of the crank case casting, and constituted by a cored passage therein. At or near the central portion of the crank case, the passage 20 is still further enlarged as by a tapered or throat portion 21, the lower or inner end of which is closed except for a stand pipe 22 or the equivalent providing a relatively restricted fluid outlet from the passage 20 to the atmosphere at a point below the bottom of the case, as at 23. It will be noted that the pipe 22 extends substantially above the liquid level indicated at 11 for a purpose hereinafter appearing, and further that there is formed an annular chamber or well 24 about the pipe 22 near the lower portion of the crank case, this arrangement constituting an oil trap and breather outlet, the function of which will hereinafter be more fully set forth. The annular chamber 24, according to the example shown, is in communication with the crank chamber through an opening 25, by preference, disposed at or near the bottom of the well and serving to equalize the oil levels in the portion 24, and in the crank chamber.

As shown at 26, the passage 12 is provided with a plurality of inwardly extending transverse fins or baffle members shown as arranged alternately on opposite sides of the passage. These baffles serve a two-fold purpose, viz., as heat absorbing and convection members and at the same time the alternated arrangement thereof, longitudinally of the passage 12, results in retarding to a substantial degree, the flow at this point of oil vapors, air and other fluids emanating from the crank case. While for convenience of illustration the fins or baffles 26 are shown only as extending inwardly of the passage 12, the rate of heat transfer from this passage to the contents of the fuel tank may be somewhat improved by the addition of other baffles (not shown) extending, for example, internally as well as externally of the wall separating the passage 12 from the interior of the fuel tank 9. Similar fins, (not shown) may be disposed on either or both surfaces of the wall portion 17 separating the fuel tank and the crank case.

The usefulness of the invention may be increased by constructing the tank 9 of a metal having a relatively high heat conductivity, for example, cast aluminum or alloys thereof.

The function of the device as a heat equalizing expedient will be apparent from the above description of parts and their arrangement, which as stated in the objects above, tends to keep the supply of oil in the crankcase cooled and conversely tends to warm the supply of fuel by heat absorption from the crankcase walls and adjacent metal structures, as well as from the oil and vapor driven into the passage 12.

The function of the passage 12, 19, 20, 22, etc., coacting with valve 14 to serve as a breather and as an oil trap will be apparent from the drawing and preceding description, but may be briefly reviewed for sake of completeness.

During one stroke of the engine piston there is a tendency for gas, other volatiles and liquid particles to move upwardly in the passage 12. Such movement is due to a momentary compression in the crankcase and is accompanied by the lifting of the valve 14, as will appear in Fig. 2. This results in a transfer of oil vapor or mist into the annular spaces 18 and thereafter into the relatively constricted, upper portion of passage 19. The greater part of the liquid particles is carried by inertia, downwardly of the engine, through the passages 19 and 20, the momentary super-atmospheric pressure in the passage 19—20 being relieved through the stand pipe 22 leading to the atmosphere at 23. The effect of the relatively enlarged portion beyond the throat 20, and still further the effect of the relatively enlarged portion 21 as the column of fluid proceeds downwardly, is to retard the velocity at these points. The expansion of the moving air column as it proceeds through the passage 19—20 and past the constricted portions thereof tends to throw liquid particles outwardly toward the walls of the passage. The greater part of suspended oil particles and mist will, as they reach the lower or outer end of passage 20, be carried by their inertia past the upper end of tube 22, and thrown back into the liquid occupying the well 24. Eventually, of course, this entrapped lubricant finds its way back into the crank chamber through the passage or opening 25. Since the oil content, whatever its form, is carried peripherally of the passage 20 practically nothing but air escapes through the pipe 22 and is liberated at 23. During the opposite stroke of the piston, the valve 14 is drawn to a closed position and a certain vacuum is created in the crank chamber which is employed to prevent leakage of oil outwardly around the bearings and similar places. A substantially unidirectional flow is maintained by coaction of the crankcase pulsations and the valve 14.

The effect of the baffles 26 in retarding, to a certain extent, the fluid flow upwardly through the passage 12, is to cause an entrapment of certain of the very heaviest liquid particles, which will return by gravity directly to the crankcase. The effect of the reversal of fluid flow between passages 12 and 19, at or near the annular chamber 18 further causes a certain entrapment of oil particles near the top of the passage 12. Such particles as are retarded on the inner or under side of valve 14 will be returned directly by gravity to the crankcase supply. It will be seen, however, that a large portion of the heat carried by the particles of oil entrapped in the passage 12 will have been imparted through the baffles 26 and the wall by which they are carried to the fuel in tank 9.

Any mist or heavier oil particles which by agitation are thrown to the top of the crankcase and fail to be driven outwardly through the passage 12, will condense or collect on the crankcase side of the member 17, tending to warm this member, and by convection the member 17 serving in turn to deliver its heat to the contents of the fuel tank.

The described structure by which crankcase heat is dissipated and by which the fuel tank temperature is raised, has been found, from the experiments of the applicants, much more practicable than the earlier attempts of dissipating crankcase heat by means of fins or ribs alone. Such ribs add greatly to the bulk and weight of the engine. The fuel tank, on the other hand, offers ample heat-radiating surface without requiring substantial additions to the weight or bulk of the engine.

The described construction produces a heat stabilizing effect, due in part to the heat storage capacity of the liquid fuel in the tank. Overload or high-speed running of the engine cannot cause the general engine temperature to rise quickly. In cold weather, when, according to the prevailing designs, there is a tendency for the crankcase and the lubricant therein to drop below the temperature of best operating efficiency during idle periods of moderate duration, the heat stored in the liquid fuel and fuel tank is available to maintain a favorable operating temperature in the crankcase, for long periods of time. A notable increase in engine efficiency results from the general elevation of the temperature of liquid fuel and the fuel tank, as well understood in the art. If the fuel used be gasoline or kerosene it vaporizes more completely in the carburetor of the engine. If the fuel be an oil of higher boiling point, such as used in compression-ignition engines, injecting liquid fuel, the efficiency of the injection process is increased and therefore the economy of the engine is improved by the present construction tending to preheat the fuel.

Of equal importance are the present facilities for the reclamation of splash and vaporized oil, this being accomplished by employing a plurality of separate coacting agents; as a mechanical oil intercepting device the baffles 26 serve to prevent expulsion of flying liquid oil particles, such as occurs with ordinary breather facilities. A further agency employed is identified with the disposition of parts by which temperature differences are maintained between the fluid in the breather passage and the members adjacent to such passage including the fuel tank. A third agency for the recovery of oil may be mentioned as constituted by the partial vacuum momentarily created in the crankcase and passage 12 when the valve 14 is operative as a closure.

Still another and perhaps the most important factor in the reclamation of oil from the fluid in the breather passages, is the provision of means for changing the velocity of the oil-air mixture as it is carried outwardly through the passage 19—20, this passage including a plurality of expanding chambers adjacent the portions 20 and 21. As the oil approaches the lower end of the passageway and enters the expanding chamber, such as 21, the heavier particles continue their downward direction to the oil level 11 while the air is slowed up and expanded, thus permitting a gravimetric separation of oil and air.

While the invention has been illustrated and described with respect to a single cylinder air-cooled engine employing a carbureted liquid fuel, it will be understood that the principles involved in this invention are not limited to an engine having any particular number of cylinders or employing any particular kind of liquid fuel and that the arrangement and proportion, for example, of the crankcase, fuel tank, as well as the fuel heating and breather passages may all be varied substantially, as may other of the parts described and their arrangement, without departing from the spirit and full intended scope of the invention as defined by the appended claims.

We claim:

1. In an internal combustion engine, a crankcase substantially enclosing a crank chamber, and a fuel tank for said engine having a wall portion common to the fuel tank and crank case, a conduit for fluid communication between the crank chamber and the atmosphere, and means for cooling and entrapping fluid in said conduit.

2. In an internal combustion engine, a crankcase having an apertured wall portion, a container for liquid fuel, said container forming a closure for the aperture in said wall portion.

3. In an internal combustion engine including a crankcase, a tank for liquid fuel and projections carried by one wall of said fuel tank and extending into heat conducting and fluid entrapment relation with crankcase fluid.

4. In an internal combustion engine including a crankcase, a fuel tank structure adjacent the crankcase and means formed by said tank structure constituting channels for fluid communication between the crankcase interior and the atmosphere.

5. In an internal combustion engine including a crankcase, a fuel tank structure adjacent the crankcase and means formed by said tank structure constituting channels for fluid communication between the crankcase interior and the atmosphere, and heat absorbing projections extending into said channels.

6. In an internal combustion engine including a crankcase, a structure constituting a container for liquid fuel and forming a passage from the crankcase to the atmosphere, said passage and container having a common wall portion.

7. In an internal combustion engine including a crankcase, a structure constituting a container for liquid fuel and forming a passage from the crankcase to the atmosphere, said passage having a wall portion common to an exterior wall portion of said fuel container.

8. In an internal combustion engine including a crankcase, a breather passage communicating with the crankcase, and means forming a liquid cooling jacket immediately adjacent to said passage.

9. In an internal combustion engine including a crankcase, a breather passage associated with the crankcase, means for cooling, by liquid, a portion of said breather passage and valve means associated with said passage for establishing therein a substantially unidirectional fluid flow.

10. In an internal combustion engine including a crankcase, a breather passage communicating with the crankcase, means constituted by said breather passage forming an expansion chamber therein, and a passage adapted for transferring liquid from said expansion chamber to said crankcase.

11. In an internal combustion engine, including a crankcase, a breather passage communicating with the crankcase, said passage having a portion of relatively enlarged sectional area and a portion of relatively reduced sectional area, said portions adapted to effect differential fluid velocities during fluid movement between the ends of said passage.

12. In an internal combustion engine including a crankcase adapted to contain a supply of oil, a breather passage communicating with said crankcase, one end of said breather passage being in communication with the atmosphere and portions of each end of said breather passage being in communication with the crankcase.

13. In an internal combustion engine including a crankcase adapted to contain a supply of oil, a breather passage communicating with the crankcase and means for cooling, by liquid, the fluid in said breather passage.

14. In an internal combustion engine including a crankcase adapted to contain a supply of oil, a passage for fluid communication between the crankcase interior and the atmosphere, and oil entrapment means associated with said passage, said means including cooling elements extending into a portion of the passage tending to condense vapors therein.

15. In an internal combustion engine including a crankcase adapted to contain a supply of oil, a breather passage communicating with the crankcase and oil entrapment means associated with said passage, said means including an annular chamber near one end of the breather passage having an outlet of restricted area to the atmosphere.

16. In combination in an internal combustion engine, a crankcase adapted to contain a supply of oil, a fuel tank disposed adjacent to the crankcase, said tank and crankcase having a common wall, means forming a breather passage communicating with the crankcase and disposed adjacent another wall of the fuel tank, a valve disposed in said breather passage, means forming an expansion chamber beyond said valve and means forming an oil trap near the outlet end of said passage.

17. In an internal combustion engine including a crankcase adapted to contain a supply of oil, and having an open side, a fuel tank constituting a closure for the open side of the crankcase, a breather passage disposed adjacent one wall of said fuel tank, a valve in said breather passage, said passage having an opening to the atmosphere beyond said valve.

18. In an internal combustion engine in combination, a crankcase adapted to contain a supply of lubricant and having an open side, a fuel tank for the engine, constituting a closure for the open side of the crankcase, means constituting in said fuel tank structure, a breather passage communicating with the crankcase, means associated with said passage for establishing a unidirectional fluid flow therethrough and means associated with said passage for entrapping particles of lubricant carried therein.

CHARLES G. MAHANA.
CHARLES GROSS.